United States Patent [19]

Morris et al.

[11] Patent Number: 4,914,451
[45] Date of Patent: Apr. 3, 1990

[54] POST-PRINTING IMAGE DEVELOPMENT OF INK-JET GENERATED TRANSPARENCIES

[75] Inventors: Peter C. Morris, El Cajon; Mark S. Hickman, Escondido, both of Calif.

[73] Assignee: Hewlett-Packard Company, Palo Alto, Calif.

[21] Appl. No.: 172,946

[22] Filed: Mar. 23, 1988

Related U.S. Application Data

[63] Continuation-in-part of Ser. No. 57,131, Jun. 1, 1987, abandoned.

[51] Int. Cl.⁴ .......................... G01D 15/34; B41J 3/04
[52] U.S. Cl. ........................................ 346/1.1; 346/25; 346/135.1; 346/140 R
[58] Field of Search ................. 346/1.1, 25, 75, 135.1, 346/140

[56] References Cited

U.S. PATENT DOCUMENTS

| | | | |
|---|---|---|---|
| 4,503,111 | 3/1985 | Jaeger | 346/1.1 X |
| 4,521,785 | 6/1985 | Matsufujii | 346/25 |
| 4,701,837 | 10/1987 | Sakaki | 346/135.1 |
| 4,733,247 | 3/1988 | Arai | 346/1.1 |

OTHER PUBLICATIONS

Titterington et al; Development of a Transparent Receiving Sheet For Ink-Jet Printing; Journal of Imaging Science, vol. 30, No. 1 J/F 1986, pp. 4-8.

Primary Examiner—Joseph W. Hartary

[57] ABSTRACT

A method of printing on an ink receptive coating (12) which enhances the density of images printed on non-ink receptive substrates (10) by ink-jet techniques is provided. The substrates, such as transparent polyester films, are coated with a layer of an material to a thickness which promotes controlled latent lateral diffusion of the printed ink dots (14a-c). The lateral diffusion is microscopically observed to begin immediately after printing, eventually ceasing as the vehicle of the ink is sufficiently spread and evaporated by the lateral spreading. The optical density of the image increases as the ink diffuses, reaching a maximum density that is considerably greater than otherwise possible without such an ink-coating system and avoids the undesirable surface coalescence of drops (14) which causes a puddled appearance in films not employing latent spreading. Sheets of such printed imaged media are stored in removable sheet protectors of a vapor permeable, water absorbent material such as cellulose acetate, such that dot spread is controlled within the teachings of the invention.

3 Claims, 1 Drawing Sheet

POST-PRINTING IMAGE DEVELOPMENT OF INK-JET GENERATED TRANSPARENCIES

CROSS-REFERENCE TO RELATED APPLICATION

The present application is a continuation-in-part application of Ser. No. 07/057,131, filed June 1, 1987, now abandoned.

TECHNICAL FIELD

The present invention relates to ink-jet devices, such as ink-jet printers, and, more particularly, to methods of enhancing and optimizing image density on non-ink receptive substrates, such as surface-modified polyester films for use in overhead transparency projections, photographic imaging, archival imaging, and the like.

BACKGROUND ART

The use of ink-jet printers to form images such as alphanumeric characters and graphics on absorbent substrates such as paper is well-known.

However, the use of the same inks on non-ink receptive substrates, such as polyester films, commonly known as Mylar, has not produced the same high density of print, which results in intense colors, obtained with inherently absorbent substrates. Such non-ink receptive substrates do not readily absorb the aqueous-based inks commonly employed in ink-jet printing, with the result that dots of ink do not spread laterally and are slow to dry. For the purposes of this disclosure, the term "non-ink receptive substrates" is used to describe those substrates comprising materials which drops of ink deposited thereon do not penetrate.

Attempts have been made to remedy the situations in which ink-jet images on non-ink receptive substrates, such as transparencies, are slow to dry or lack capacity to absorb sufficient volumes of ink, with a goal of approaching performance obtained with highly absorbent, porous media. One such attempt is described in a technical paper by D. R. Titterington et al, "Development of a Transparent Receiving Sheet for Ink-Jet Printing", *Journal of Imaging Science*, Vol. 30, No. 1, pp. 4-8 (Jan/Feb 1986); see also U.S. Pat. No. 4,503,111. This reference describes the use of certain transparent hydrophilic coatings to permit the use of aqueous-based inks for printing on transparent media. However, the reference mostly addresses the problem of slow drying of transparencies. It does not disclose ways to improve image density.

While such coatings are useful, considerable work remains to be done to develop suitable inks and coatings and methods of application that permit substantially uniform high color density images to be produced on non-ink receptive substrates, whether transparent or otherwise, approaching that which can be produced on ink-receptive substrates, such as paper.

Often, it is desired to store printed images, such as transparencies, by insertion into removable, clear plastic sheet protectors of a type that allow filing in a 3-ring binder. Such sheet protectors can be removed for projection. However, most such protective holders, when used soon after printing images on ink-receptive coatings formed on non-ink receptive substrates, cause problems such as image smearing due to trapped ink vehicle.

Thus, a need remains to develop improved ways for generating stable images on non-ink receptive substrates, such as overhead transparency projections, using ink-jet printing methods.

DISCLOSURE OF INVENTION

In accordance with the invention, a method of printing on a non-ink receptive substrate provided with an ink-receptive coating to provide images having increased color uniformity and density comprises a four-step mechanism. The components of the printing method are selected to optimize the four-phase imaging process. The phases are: placement of drops of ink by ink-jet techniques onto the ink-receptive coating such that adjacent drops do not contact one another, penetration of ink drops into the non-ink receptive coating without surface coalescence to form ink dots, followed by radial diffusion of the ink dots within the coating, then followed by termination of dot growth at an optimal size by solvent elimination.

In particular, the method of the invention comprises printing on a non-ink receptive substrate having an ink-receptive coating thereon to form an imaged medium:

(a) employing as the ink-receptive coating a material such that
 (1) upon depositing ink drops on the surface thereof, adjacent drops of ink do not contact one another,
 (2) the drops of ink are then absorbed into the ink-receptive coating to form dots of ink,
 (3) radial diffusion of the dots then occurs within the ink-receptive layer until the dots achieve a dot size at least about $v2/DPI$, where DPI is the number of dots per inch, and
 (4) radial diffusion of the dots is then terminated by solvent elimination from the ink-receptive layer such that the dot size is less than about $2/DPI$; and (b) printing an ink on the ink-receptive coating by ink-jet techniques.

The ink employed should comprise a solution of one or more dyes in a vehicle containing one or more suitable solvents. Such dyes must have suitable solubility, color, intensity, stability and polarity, and the solvents should have suitable volatility and polarity, for use in the practice of the invention.

Thus, a method of printing on a non-ink receptive substrate, such as an overhead transparency film, which avoids the common problem of surface coalescence of ink drops yet enhances the density of images printed by ink-jet techniques is provided. The latent dot spreading begins immediately upon printing and proceeds for about 1 to 2 hours after the film has been printed and dried to the touch. The vehicle or solvent portion of the ink migrates radially from the dot origin and causes diffusion of the dye or colorant within the ink-receptive layer coated on the film substrate.

The resultant image has much higher optical density and more pleasing print quality than systems where either individual drop dots can be discerned or large coalesced puddles are formed in the final image. Rather, a smooth uniform image prevails upon printing a non-ink receptive substrate with the present invention.

Also in accordance with the invention, a removable sheet protector comprising a vapor permeable and water absorbent material is used in storing printed images, such as transparencies, immediately after imaging. The use of such absorbent and permeable sheet protectors precludes long term need for drying of the images in air prior to storage. Consequently, the final printed image has the same quality of images dried in air.

BEST MODES FOR CARRYING OUT THE INVENTION

Improved image density on non-ink receptive substrates, such as transparent films, is obtained by providing the substrate with a coating which coacts with the ink to promote sufficient post-printing diffusion of the ink. Such a coating is called herein an ink-receptive coating.

The non-ink receptive substrate employed in the practice of the invention is one that finds use, for example, in overhead transparency projections. Exemplary of a material used in such applications is polyester film, such as polyethylene terephthalate (PET), commonly available as Mylar from E.I. duPont de Nemours, Inc. (Wilmington, Del.). Other uses include glossy imaging, such as photographic-quality images, archival images, and the like produced by ink-jet printing.

The discussion which follows is specific to transparencies. However, it will be readily apparent that the teachings of the invention are equally applicable to the other uses mentioned above, whether the non-ink receptive substrate is transparent or otherwise.

The hydrophobic nature of the non-ink receptive substrate prevents absorption of the ink drop deposited on the substrate by ink-jet printing. To overcome the lack of ink drop absorption, absorptive coatings or surface treatments are applied to permit reception of drops. However, upon projection of the image through an overhead projector, a pale or low density image is perceived with prior art approaches.

On the other hand, by providing an ink/coating combination having certain specific properties, as described in detail below, the ink drops penetrate the film to form ink dots, which then spread laterally within the coating after printing to form continuous arrays of dots. The result is a projected image having a considerably greater density of color due to elimination of white light projecting though gaps in the dot arrays.

The coating has the property such that upon depositing ink drops on the surface thereof, adjacent drops do not contact one another. The drop-to-drop spacing is 1/DPI, where DPI is the drops per inch. Thus, there is no detrimental coalescing of ink drops on the coating. Of course, for transparency projections, the coating is also optically transparent.

Figure 1:
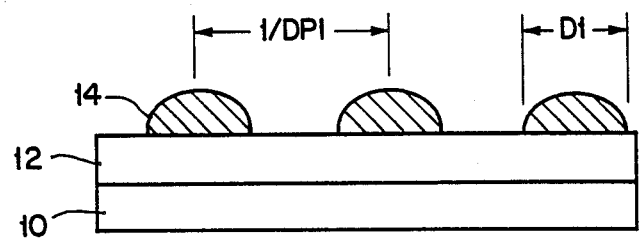
FIGS. 1-4 are cross-sectional views depicting the sequence of events from deposition of drops of ink on the ink-receptive coating formed on the non-ink receptive substrate to "clamping" of the dots of ink within the ink-receptive coating as solvent evaporation terminates the dot-spreading process.

FIG. 1 depicts a non-ink receptive coating 10, upon which an ink receptive coating 12 is formed. Drops of ink 14 having a surface diameter D1, where D1<1/DPI, are deposited on the surface of the receptive coating 12 by an ink-jet device (not shown). The center-to-center spacing of drops is accordingly 1/DPI.

Figure 2:
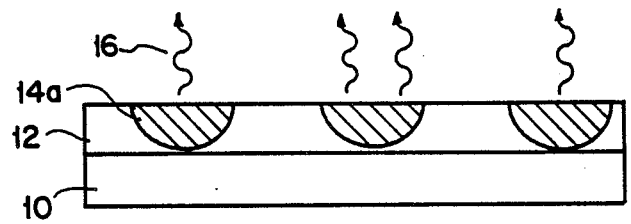

The coating 12 rapidly absorbs the ink drops, to form ink dots 14a, as shown in FIG. 2. However, while the ink is absorbed by the coating 12, the dye is not fixed by the coating. As a consequence, the ink dots 14a diffuse within the coating after printing. The coating 12 is capable of supporting such absorption and lateral diffusion, permitting the ink dots 14a to diffuse to the optimal size.

Figure 3:
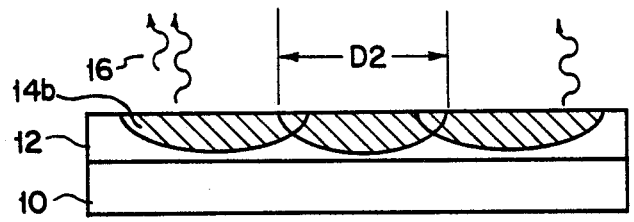
Figure 4:
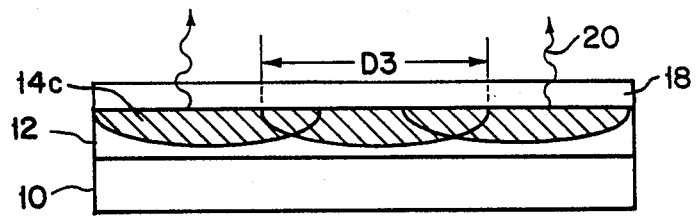

The latent lateral diffusion process is depicted in FIGS. 3 and 4. As the ink dots diffuse laterally (14b, 14c), solvent evaporates, as depicted by arrows 16.

Essentially, the ink vehicle spreads laterally, which transports the dye coextensively. The combination is such that as the vehicle becomes more diluted during spreading and evaporation, it is no longer able to transport the dye, and the lateral spreading of the dye ceases. However, the lateral movement of the dye that has occurred is sufficient to yield ink dots 14b with diameters greater than about $\nu 2$ (or 1.41) times dot spacing, thereby creating the desired effect (FIG. 3).

Radial diffusion of the dots then terminates by solvent elimination 16 from the coating 12 such that the final dot size 14c is less than about 2/DPI.

An overhead transparency showing the desired performance can be generated by ink-jet printing with an ink/-coating combination comprising, for example, an ink consisting essentially of Food Black 2 dye in a 50/50 weight ratio of water/diethylene glycol vehicle printed on a transparent film, which includes an ink-receptive coating thereon, and printed at a resolution of 180 dots per inch.

Another example of a suitable coating is polyacrylic acid, a resin which is available from B. F. Goodrich as Carbopol 907 and which can be readily coated from alcohol solutions. The polyacrylic acid is available in a free acid form with a molecular weight ranging from about 250,000 to 1,250,000. The polyacrylic acid coating, when dry, has a preferred thickness ranging from about 4 to 12 $\mu$m. If the coating is less than about 4 $\mu$m, then too much dot growth is observed, with consequent loss of resolution, while if it is greater than about 12 $\mu$m, then too little dot growth is observed, with consequent poor color density. For other coatings, this range may vary, but is readily determinable without undue experimentation.

The optimal coating prevents drop coalescence by providing an initial dot size $\nu 1$/DPI. This prevents adjacent drops from coalescing and allows post-print lateral spreading until the dot size grows to $\geq \nu 2$/DPI, yielding complete overlap of adjacent drops. Commonly, DPI ranges from about 100 to 400.

The initial dot size must be $\nu 1$/DPI to prevent coalescence or puddling of drops of ink. The final dot size must be at least about $\nu 2$/DPI and less than about 2/DPI to eliminate any uncolored area between adjacent dots and to avoid fuzzy or distorted images.

Preferably, both sides of the non-ink receptive substrate are coated. This prevents buckling due to hygroscopicity of the coating, even though only one side is printed.

The coating may be applied by any of the conventional techniques for applying coatings to films, including air knife, doctor blade, gravure, metering rod, reverse roll, etc. The coating may be applied as an aqueous solution or emulsion or as a solvent lacquer. The coating may be post-cured thermally or by irradiation.

The ink preferably contains a water-based vehicle containing about 30 to 99 wt % water to impart volatility and solubility, with the balance comprising higher boiling solvents, such as glycols, glycol ethers, pyrrolidones and amides to optimize penetration and polarity. The ink preferably contains acid or direct dyes which are available in optimal solubility, colors and polarity.

Immediately following printing, a microscopic view of the image shows discernible dots. The optical density has a measurable value. However, after a period of time, the printed dots are observed to spread laterally until the dots are no longer discernible and the optical density increases considerably, as much as three-fold. After a further period of time, the lateral spreading ceases, as does the increase in optical density. Macroscopically, the only change observable is the increase in optical density, as seen in the increased intensity of colors.

Diffusion begins as soon as the drops penetrate the surface of the coating after printing and ceases as a consequence of vehicle evaporation by about 1 to 2 hours later. The increase in color density is observed to follow the diffusion time onset and cessation. However, the image itself is dry to the touch in less than about 60 seconds. In direct contrast, ink on uncoated Mylar just beads up and wipes off, without absorbing thereinto.

While it is not presently possible to predict ahead of time whether a particular material will be a suitable coating, the teachings above provide a facile method of determining suitability of such material for the application claimed herein.

Use of a vapor permeable and water absorbent sheet protector permits obtaining substantially the same results as if the coated non-ink receptive substrate, or imaged medium, were dried in air without waiting for the ink to dry. Such a sheet protector must have a water absorption greater than about 3% and a water vapor transmission rate greater than about 10 g water per 1 mil thickness per 100 square inches per 24 hours in order to promote the correct amount of lateral dot spread, indicated above. An example of a suitable material is an acetate, e.g., cellulose diacetate or triacetate. The sheet protector may be removed prior to projecting a transparency for maximum clarity and brightness.

The use of sheet protectors made of acetate or other material having the properties indicated above for storing imaged media has several advantages over conventional sheet protectors such as polyvinyl chloride (PVC), polypropylene and polyester (polyethylene terephthalate PET). The vapor permeability allows for solvent (vehicle) from the inks to leave the imaged media/sleeve system, and for long term drying of the inks to be similar to drying in air. The net result of this property is that the dot growth (intentional, controlled diffusion) on the imaged media in accordance with the invention will be nearly the same when air dried or placed in the preferred sheet protector.

Vapor impermeable sleeves are unlikely to match air dried quality, and are more likely to cause permanent changes in clarity due to solvent trapping.

Vehicle absorption at a proper level is necessary to prevent optical contact between the sheet protector and the imaged surface of the substrate, a behavior referred to as "blocking". Blocking is visible as blotches or puddles, and can permanently damage an image on coated non-ink receptive substrates. Blocking also appears on other such substrates when sleeved in conventional sheet protectors, especially if printing or plotting is done in humid environments, but this blocking does not typically cause permanent damage to the image. The use of acetate protectors in accordance with this aspect of the invention helps prevent blocking with many imaged media, and will also provide a quick initial drying of the solvents to help protect the image, while still maintaining complete optical clarity as solvents as absorbed.

INDUSTRIAL APPLICABILITY

The method of the invention will find use in printing non-ink receptive substrates, such as overhead transparency projections, evidencing greater color density than heretofore obtained.

EXAMPLES

Example 1.

A polyester film medium, or substrate, possessing an ink-receptive coating comprising polyacrylic acid at a dry thickness of 5 $\mu$m, was printed with an ink-jet engine employing an ink of aqueous base and soluble dye. In particular, the ink comprised 48 parts diethylene glycol, 48 parts water and 4 parts Food Black 2. All parts are by weight, unless otherwise specified.

The ink was applied as 90 picoliter (pl) drops at 180 DPI (32,400 dots/in$^2$) with a double pass of the ink-jet printhead.

The optical density of the resulting image was measured immediately after printing and again at 5 minute intervals. The optical density increased from 0.45 at time t=0 to 1.05 maximum at time t=60 minutes. Magnified examination of the image showed distinct drop dots of 0.004 inch diameter at time t=0 which diffused together to give a smooth coverage at time t=60 minutes. Macroscopically, the image increased in intensity while retaining sharpness of boundaries.

Example 2:

A transparency which had an ink-receptive coating thereon was printed with an ink-jet engine employing an ink of aqueous base and soluble dye. In particular, the ink comprised 48 parts diethylene glycol, 48 parts water and 4 parts Food Black 2.

The ink was applied as 90 picoliter (pl) drops at 180 DPI (32,400 dots/in$^2$) with a double pass of the ink-jet printhead.

The optical density of the resulting image was measured immediately after printing and again at 5 minute intervals. The optical density increased from 0.45 at time t=0 to 1.05 maximum at time t=60 minutes. Magnified examination of the image showed distinct dots of 0.004 inch diameter at time t=0 which diffused together to give a smooth coverage at time t=60 minutes. Macroscopically, the image increased in intensity while retaining sharpness of boundaries.

Example 3:

For comparison, it was observed that printing on uncoated Mylar was not practical, due to beading of the ink, which was readily removable by wiping.

Example 4:

In another comparison, one with a coated Mylar film commercially available, which employs a coating comprising a water-soluble, polymeric mixture of polyvinylpyrrolidone (PVP) and polyvinyl alcohol (PVA) having a composition within the teachings of U.S. Pat. No. 4,503,111 issued to Jaeger et al, was similarly printed. Specifically, a 1:1 ratio of PVP:PVA was employed. The molecular weight of PVP was 360,000 and the PVA was fully hydrolyzed, with a molecular weight of 40,000.

Magnified examination of the image showed distinct drops of 0.0035 inch diameter at time t=0 and of the same diameter at time t=60 minutes. Thus, there was no latent lateral diffusion. Macroscopically, the image appeared as a blotchy image and lighter in color than that obtained in accordance with the invention.

Example 5.

Printed Hewlett-Packard 51360Q transparencies, prepared in accordance with the teachings of the invention, were inserted into removable sheet protectors comprising various materials and the extent of vehicle retained in each transparency was compared over a period of time to an unprotected transparency. The results are summarized in the Table below:

TABLE

Percent of Ink Vehicle Retained by Film Enclosed in 3 Mil Thick Sheet Protectors

| Sheet Protection Material | wt % Vehicle Retained | | |
|---|---|---|---|
| | 1 Day | 1 Week | 1 Month |
| None (open to air) | 78 | 10 | <1 |
| Cellulose acetate | 86 | 21 | <1 |
| Rigid polyvinyl chloride (PVC) | >99 | >99 | 98 |
| Plasticized PVC | >99 | >99 | 99 |
| Amorphous polypropylene | >99 | >99 | >99 |
| Biaxially oriented polypropylene | >99 | >99 | >99 |
| Polyester (PET) | 99 | 98 | 97 |

The data show that of the commercially available sheet protector materials, acetate is uniquely suitable for protecting ink-jet transparencies while allowing the transparency to eliminate ink vehicle and stop spot growth at an optimal level.

Thus, there has been disclosed a method of printing on non-ink receptive substrates such as polyester that results in improved color density. Many changes and modifications will occur to those of ordinary skill in the art, and all such changes and modifications are intended to fall within the scope of the invention, as defined by the appended claims.

What is claimed is:

1. A method of printing on a non-ink receptive substrate having an ink-receptive coating thereon to form an imaged medium, comprising:
   (a) employing as said ink-receptive coating a material such that
      (1) upon depositing ink drops on the surface thereof, adjacent drops of ink do not contact one another,
      (2) said drops of ink are then absorbed into said ink-receptive coating to form dots of ink,
      (3) radial diffusion of said dots then occurs within said ink-receptive layer until said dots achieve a dot size at least about $\nu 2/DPI$, where DPI is the number of dots per inch, and
      (4) radial diffusion of said dots is then terminated by solvent elimination from said ink-receptive layer such that said dot size is less than about $2/DPI$;
   (b) printing an ink on said ink-receptive coating by ink-jet techniques; and
   (c) storing said imaged medium between removable protective sheets comprising a cellulose acetate having water absorption greater than 3% and water vapor transmission rate greater than 10 g water per 1 mil thickness per 100 square inches per 24 hours, such that the correct amount of lateral dot spread is promoted.

2. The method of claim 1 wherein said non-ink receptive substrate comprises a polyester film base and said ink-receptive coating comprises a polyacrylic acid layer having a dry film thickness ranging from about 4 to 12 μm.

3. A method of printing on a non-ink receptive, transparent substrate having an ink-receptive, transparent coating thereon to form a transparent, imaged medium, comprising:
   (a) employing as said ink-receptive coating a material such that
      (1) upon depositing ink drops on the surface thereof, adjacent drops of ink do not contact one another,
      (2) said drops of ink are then absorbed into said ink-receptive coating to form drops of ink,
      (3) radial diffusion of said dots then occurs within said ink-receptive layer until said dots achieve a dot size at least about $\nu 2/DPI$, where DPI is the number of dots per inch, and
      (4) radial diffusion of said dots is then terminated by solvent elimination from said ink receptive layer such that said dot size is less than about $2/DPI$,
   (b) printing an ink on said ink-receptive coating by ink-jet techniques, and
   (c) storing said imaged medium between removable protective sheets comprising a cellulose acetate having water absorption greater than 3% and water vapor transmission rate greater than 10 g water per 1 mil thickness per 100 square inches per 24 hours, such that the correct amount of lateral dot spread is promoted.

* * * * *